(12) United States Patent
Alldredge

(10) Patent No.: US 6,181,931 B1
(45) Date of Patent: Jan. 30, 2001

(54) METHOD AND APPARATUS FOR DYNAMIC ADDRESS ALLOCATION IN A WIRELESS COMMUNICATION SYSTEM

(75) Inventor: Lawrence G. Alldredge, La Jolla, CA (US)

(73) Assignee: Qualcomm Inc., San Diego, CA (US)

( * ) Notice: Under 35 U.S.C. 154(b), the term of this patent shall be extended for 0 days.

(21) Appl. No.: 09/143,635

(22) Filed: Aug. 28, 1998

(51) Int. Cl.$^7$ ....................................... H04Q 7/20
(52) U.S. Cl. ................. 455/427; 455/435; 455/186.1; 370/321
(58) Field of Search ................................ 455/427, 428, 455/430, 432, 433, 435, 436, 456, 457, 445, 519, 12.1, 13.1, 517, 518, 418–420, 186.1; 370/316, 319, 321, 351, 352

(56) References Cited

U.S. PATENT DOCUMENTS 4,928,274  5/1990  Gilhousen et al. .
4,979,170 * 12/1990  Gilhousen et al. ................. 455/12.1
5,408,683 *  4/1995  Ablay et al. ......................... 455/435
5,708,655 *  1/1998  Toth et al. ........................... 370/319

FOREIGN PATENT DOCUMENTS 9720413  6/1997  (WO) ........................... H04L/12/56

* cited by examiner

Primary Examiner—Reinhard J. Eisenzopf
Assistant Examiner—Lester G. Kincaid
(74) Attorney, Agent, or Firm—Gregory D. Ogrod; Thomas M. Thibault

(57) ABSTRACT

A method and apparatus for dynamically assigning identification information to mobile communication terminals (MCTs) in a satellite communication system. A subset of identification addresses is reserved out of an original set of addresses to be used for MCT identification on an as needed basis. When an MCT first acquires a signal from a first Network Management Computer (NMC), a first identification address is assigned to the requesting MCT for use in all subsequent communications. If the MCT later begins communications using a second NMC, the second NMC assigns a new identification address to the MCT and instructs the first NMC to withdraw the first identification address so it can be assigned to another MCT.

13 Claims, 5 Drawing Sheets

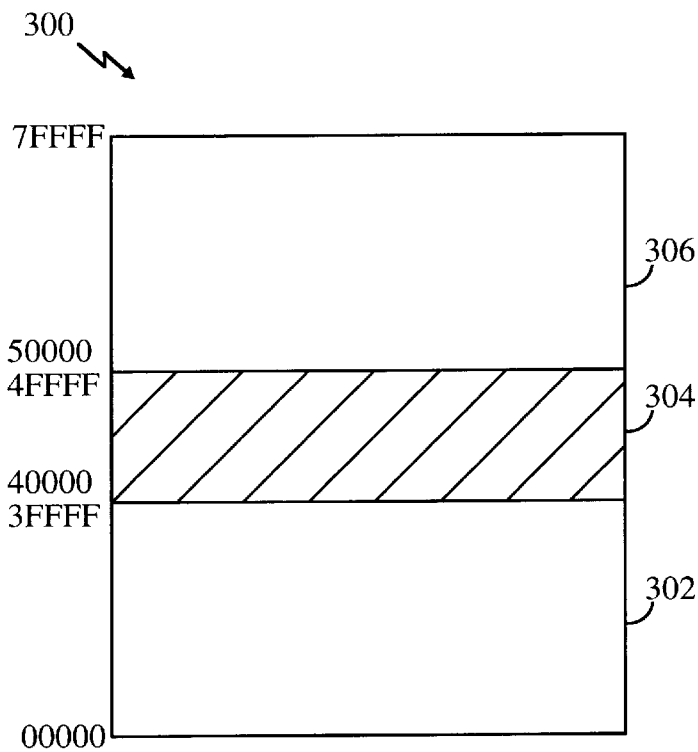

METHOD AND APPARATUS FOR DYNAMIC ADDRESS ALLOCATION IN A WIRELESS COMMUNICATION SYSTEM

BACKGROUND OF THE INVENTION

1. Field of the Invention

The present invention relates generally to wireless communication systems and more particularly to a method and apparatus for dynamically allocating identification address information to a communication device, such as a mobile communication terminal in a satellite communication system.

2. Description of the Related Art

The use of wireless communication systems is well known for transmitting information between fixed stations and one or more geographically dispersed mobile receivers. For example, satellite communication systems have been used in the trucking industry for many years to provide messaging and location information between fleet-owned dispatch centers and their respective tractor-trailer vehicles. Such systems offer significant benefits to fleet owners because they allow almost instantaneous communications and real-time position information. In addition, many such systems provide remote monitoring of the performance characteristics of each fleet-owned vehicle, such as average speed, RPM, idle time, and so on. An example of such a satellite communication system is disclosed in U.S. Pat. No. 4,979,170 entitled "ALTERNATING SEQUENTIAL HALF DUPLEX COMMUNICATION SYSTEM AND METHOD", U.S. Pat. No. 4,928,274 entitled "MULTI-PLEXED ADDRESS CONTROL IN A TDM COMMUNICATION SYSTEM", and U.S. Pat. No. 5,017,926 entitled "DUAL SATELLITE NAVIGATION SYSTEM", assigned to the assignee of the present invention and incorporated by reference herein.

In the satellite communication system described by the abovementioned patents, fleet-owned dispatch centers communicate by way of land-based systems such as telephone or fiber-optic systems to a hub, otherwise known as a network management facility (NMF). The NMF acts as a central communication station through which all communications between vehicles and dispatch centers pass. The NMF comprises a number of network management computers (NMCs), each NMC being responsible for providing a communication path from the NMF to geographically dispersed vehicles in the communication system by way of a geosynchronous satellite. The geosynchronous satellite comprises one or more transponders, which are electronic circuits well known in the art for relaying high frequency satellite communication signals between remote locations. Each NMC is assigned an individual transponder, each transponder operating at a unique frequency in order to avoid interference with communication signals on other transponders. In the satellite communication system of the above-referenced patents, each transponder is capable of handling the communications of approximately 30,000 vehicles.

Each vehicle in the communication system is equipped with a transceiver, otherwise known as a mobile communication terminal (MCT), for communicating message and location information to a pre-designated NMC by way of the geosynchronous satellite. The MCT typically also comprises an interface device which displays messages to one or more vehicle occupants, and accepts either voice or text messages to be transmitted to a dispatch center corresponding to the particular vehicle. Furthermore, the MCT may further comprise a digital computer which communicates with one or more Electronic Control Units (ECUs) located at various points throughout the vehicle. Each ECU provides operational information to the digital computer indicating performance characteristics such as vehicle speed, engine RPM, and miles traveled, and other operating characteristics.

NMCs and MCTs communicate with each other using a pre-defined messaging protocol. The messaging protocol arranges digital data into manageable segments, called frames, which include address frames and data frames. Typically, an address frame is transmitted followed by one or more data frames. The address frame contains the necessary MCT identification information in order to route messages from an NMC to one or more identified vehicles and to identify the origin of incoming messages from vehicles. Data frames contain the actual information which is to be conveyed, for example, voice, operation, or location data.

An important feature of the satellite communication system just described is the ability for NMCs to uniquely identify MCTs which are operating in the communication system. The ability to uniquely identify MCTs allows NMCs to route messages to individual vehicles for which they are intended and also to identify the origin of incoming messages from vehicles. In the satellite communication system described by the above-mentioned patents, each MCT in the system is permanently assigned a unique identification address from a set of available identification addresses stored within the NMF. Each assigned identification address identifies a particular MCT, the address being identical to a unique, pre-assigned MCT serial number, assigned at a manufacturing facility. The identification address is attached to each message transmitted, using the address frame, to identify the intended recipient or the source of messages. The number of MCTs which can be uniquely identified in the system is limited by the maximum size of the address frame. In the communication system described in the above-referenced patents, the address field in the address frame is 19 bits in size. Therefore, the maximum number of MCTs which can be uniquely identified in the system is $2^{19}$, or 524,288 MCTs.

The maximum number of MCTs that can be uniquely identified in current communication systems using the fixed address frame protocol is approaching rapidly, as new MCTs are added to the system on a daily basis. As such, there is a need to modify the existing communication protocol in order to allow a greater number of MCTs to operate in the system over and above the maximum limitation set by the address frame. Simply increasing the size of the address frame is not a feasible solution, as this would require a complete overhaul of the message protocol and a recall of all MCTs currently in use. Nor would the creation of a completely new communication system be acceptable, as this would also require major hardware and software modifications to existing MCTs and NMFs. Therefore, a modification of the present system is desirable which should be backward-compatible with existing MCTs to eliminate the need for a recall of the existing units.

SUMMARY OF THE INVENTION

The present invention is a method and apparatus for dynamic address allocation for mobile communication terminals (MCTs) in a wireless communication system. The invention utilizes present messaging protocols so that existing MCTs are not required to be recalled in order to implement the changes necessary to effectuate the present invention.

In accordance with the teachings of the present invention, each NMC reserves a subset of identification addresses out of a fixed number of identification addresses used to uniquely identify MCTs in the communication system. In the past, identification addresses were assigned to MCTs on a permanent basis, each NMC using the same permanent address to reference a particular MCT. In the present invention, identification addresses are no longer unique throughout the NMCs. Each NMC assigns its own identification address to MCTs which it is in communication with, the address being unique within each NMC but not to other NMCs. As a result, as an MCT communicates through different NMCs in the system, a new identification address is assigned by a current NMC, and a previously assigned identification address is withdrawn by the former NMC. The withdrawn identification address may then be used to identify a different MCT operating on the former NMC.

An MCT will require a new identification address upon the occurrence of a number of pre-defined events. For example, when an MCT is placed in service for the first time, a first NMC assigns an unused first identification address to the MCT from the reserved subset of identification addresses. Any messages sent between the first NMC ;and the MCT will be identified using the first identification address. If an event occurs which forces the MCT to communicate through a second NMC, such as the MCT moving out of a current satellite coverage area, a second identification address is assigned to the MCT by the second NMC. The MCT then communicates with the second NMC using the second identification address. After the MCT has successfully been assigned the second identification address, the second NMC sends a message to the first NMC instructing that the first identification address be withdrawn. The first identification address may now be assigned to another MCT by the first NMC. The second identification address may be the same as the first identification address, since addresses between NMCs are unique.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is an address diagram which graphically illustrates an address structure in accordance with the teachings of the present invention;

FIG. 4 illustrates an address frame comprising a data channel field and an address field;

FIG. 5 illustrates an address assignment frame used to communicate identification addresses in accordance with the teachings of the present invention.

DETAILED DESCRIPTION OF THE PREFERRED EMBODIMENTS

The present invention is a method and apparatus for dynamically assigning identification address information to mobile communication terminals (MCTs) in a satellite communication system. The dynamic addressing scheme preserves present message protocols used between MCTs and a Network Management Facility (NMF) in the communication system, and allows more MCTs to be identified within the communication system, given the present communication protocol.

Figure 1:
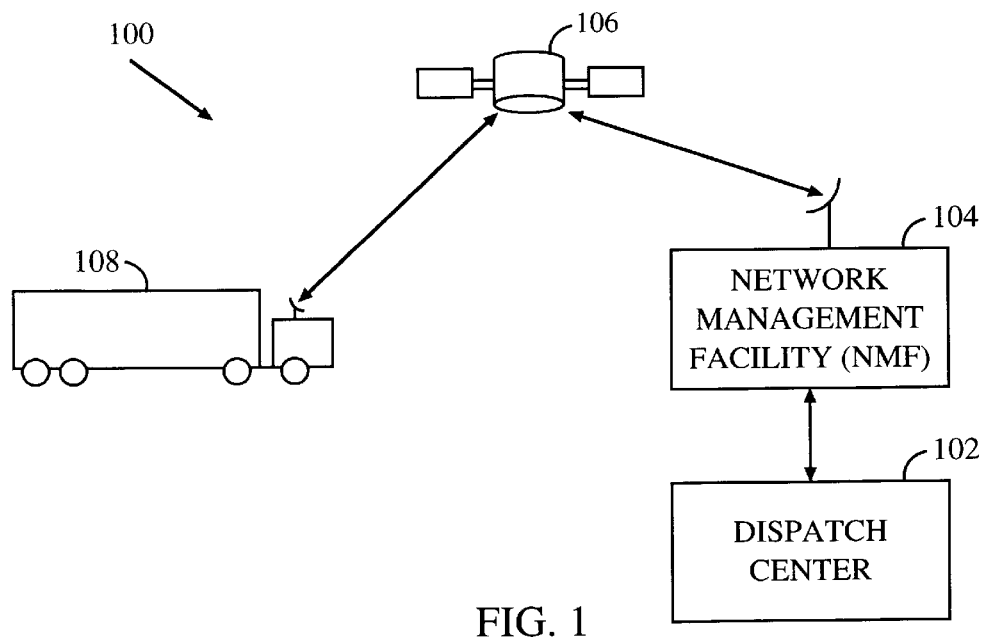
FIG. 1 illustrates a satellite communication system in which the present invention is used.

FIG. 1 is an illustration of a satellite communication system in accordance with one embodiment of the present invention. Although a satellite communication system with respect to the trucking industry is illustrated in FIG. 1 and throughout this specification, it should be understood that the teachings of the present invention are equally applicable to other varieties of satellite communication systems including satellite telecommunication systems, satellite television systems, and satellite location systems, among others. In addition, the present invention may be used in non-satellite wireless communication systems as well.

FIG. 1 illustrates a satellite communications system 100, comprising a dispatch center 102, at least one Network Management Facility (NMF) 104 (otherwise known as a central facility or hub), a communication satellite 106, and a vehicle 108. Communications in the form of data and voice messages are transmitted between dispatch center 102 and vehicle 108 and vice-versa by way of NMF 104 and communication satellite 106. A transceiver, or mobile communication terminal (MCT) (not shown), within vehicle 108 allows messages to be transmitted and received by vehicle 108 as it travels throughout a large geographical area within the coverage area of satellite 106. A second transceiver (also not shown) is located within NMF 104 which allows communications to be transmitted and received by NMF 104. Although a single vehicle 108 is shown in the communication system of FIG. 1 for clarity, a large number of vehicles, each equipped with an MCT, typically operate in the system. Similarly, although only one dispatch center 102 is shown in FIG. 1, in practice, many dispatch c(enters communicate through their corresponding fleet of vehicles through NMF 104 and satellite 106.

Satellite 106 comprises a large number of transponders through which communication signals are processed. Transponders are well known in the art for providing a conduit for messages between two or more locations on Earth. Each transponder has a finite bandwidth capable of relaying a fixed number of communication signals at any given time. For example, in the satellite communication system described by aforementioned U.S. Pat. Nos. 4,979,170, 4,928,274, and 5,017,926, each transponder can process approximately communications for up to 30,000 vehicles. Accordingly, more than one transponder must be used in a communication system having more than 30,000 vehicles.

Each transponder on satellite 106 operates at a slightly different frequency from each other, in order to avoid interference from communication signals using other transponders. As a result, the transceivers located at NMF 104 must contain circuitry to modulate and demodulate signals at appropriate frequencies in accordance with the particular transponder assigned to them. In MCT 110, a single tunable upconverter/downconverter circuit is used which is programmed to operate at a particular frequency corresponding to an assigned transponder. Upconverters and downconverters are well known in the art for shifting the frequency of modulated communication signals up and down, respectively. NMF 104 and MCT 110 each contain an upconverter/downconverter pair for each transponder used in communication system 100. In NMF 104, each upconverter/downconverter pair is controlled by a Network Management Computer (NMC) (200, 202, 204 in FIG. 2). When communications are first initiated between MCT 110 and NMF 104, MCT 110 is assigned to a particular NMC and a corresponding transponder through which to communicate.

MCT 110 will continue to communicate with an assigned NMC using the same transponder until a pre-defined event occurs. For example, one pre-defined event may be defined as when MCT 110 travels outside the coverage area of satellite 106, requiring communication through an alternate satellite. When this occurs, MCT 110 will generally be assigned to a different transponder and NMC than what it was previously communicating through. Another pre-defined event in which MCT 110 will be assigned a new transponder is a when the transponder through which MCT 110 is communicating is nearing its capacity limit. A typical maximum limit of simultaneous communications through which a single transponder can maintain is approximately 30,000. As a transponder maximum capacity is neared, it is advantageous to direct other MCTs to communicate through a new transponder having more capacity.

In a typical satellite communication system, each MCT 110 in the system is assigned a unique identification code to distinguish it from other MCTs in the system. For example, a manufacturer's serial number is generally assigned to each MCT 110 during the manufacturing process. In the exemplary embodiment, the MCT serial number is used by communication system 100 to address messages to specific MCTs and also to identify the source of messages received by NMCs, as explained below.

When it is desired for dispatch center 102 to communicate with a particular one of its vehicles, a message is transmitted from dispatch center 102 to NMF 104, generally using terrestrial-based communication links, such as fiber optic or telephonic links. Messages are appended with vehicle identification information so that the message can be transmitted to one or more vehicles of interest. Messages, including the vehicle identification information, are communicated between dispatch center 102 and NMF 104 using a pre-defined messaging protocol. A similar protocol is used to allow communications between NMF 104 and vehicle 108. In a communication system utilizing the present invention, messages are sent in digital packets, each packet having pre-defined fields for transmitting different kinds of information.

Each digital packet transmitted in the communication system by dispatch center 102 and MCT 110 comprises an address frame for identifying a particular vehicle in the system and at least one data frame where a message or a partial message is stored. In prior art communication systems, each MCT 110 in the communication system is permanently assigned an identification address which is equal to each MCT's pre-assigned serial number. The identification address is inserted into the address frame to identify the source or destination of transmitted packets. The number of identification addresses is limited by the length of the address field, which is 19 bits long in the exemplary embodiment. This allows 524,288 unique identification addresses and, thus, 524,288 vehicles in communication system 100 which may be uniquely identified. In the prior art system, identification addresses are permanently assigned to respective MCTs as they are introduced into the system.

In present communication systems, the number of unique addresses is sometimes reduced to accommodate other features of the system. For example, in the satellite communication system of the '170, '274, and '926 patents, only half of the 524,288 addresses are available for identifying individual MCTs. The other half is used for identifying groups of MCTs for purposes of distributing group messages and the like.

Figure 2:
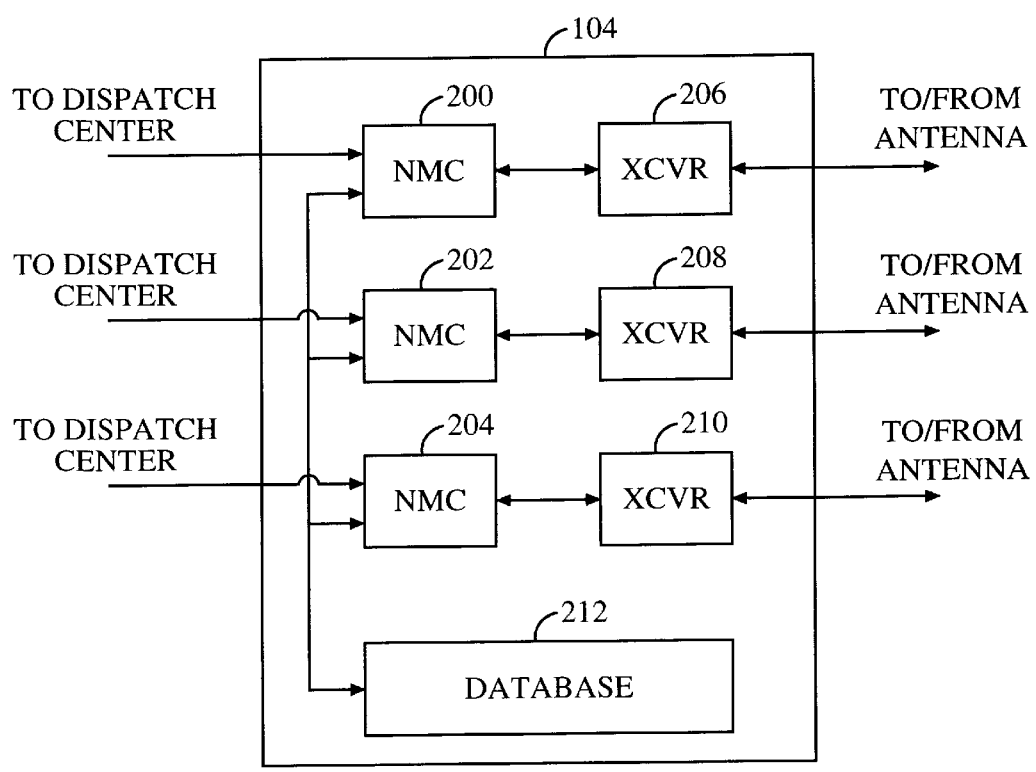
FIG. 2 illustrates the components necessary to implement the present invention.

FIG. 2 illustrates the components necessary to implement the present invention. NMF 104 comprises NMC 200, NMC 202, NMC 204, corresponding transceivers 206, 208, 210, and database 212. Although only three pairs of NMC/transceiver combinations are shown in FIG. 2, it should be understood that NMF 104 may comprise a greater or fewer number of NMC/transceiver pairs. In addition, although only one database 212 is shown, each NMC could be connected to a corresponding independent database for storing identification addresses and other information corresponding to respective NMCs.

Voice and/or data messages are provided to each NMC from one or more dispatch centers, generally through land-based communication systems. Each NMC is connected to database 212 which stores both assigned and unassigned identification addresses for each NMC. Assigned identification addresses are those which have been assigned to corresponding MCTs operating in the communication system. Thus, database 212 stores at least an MCT identification number corresponding to its assigned identification address. The MCT identification number is typically a pre-assigned serial number. Other useful information can be stored in addition to the identification address/MCT serial number information as well.

Voice and/or data messages are routed to the appropriate NMC depending on which NMC a particular MCT is assigned. Each NMC is connected to all other NMCs within NMF 104 for communicating information to each other, such as withdrawal instructions, as will be explained later herein. Each NMC is also connected to a corresponding transceiver, which receives signals from the NMC and modulates them in accordance with the particular transmission method being used. Each transceiver also de-modulates received communications from MCTs and provides the result to a corresponding NMC. Each transceiver typically operates on a pair of frequencies, one for transmitting messages and one for receiving messages. In addition, each transceiver frequency pair typically operates at slightly different frequencies than the other transceivers, corresponding to the operating frequencies of the respective satellite transponders through which each NMC communicates. The output of each transceiver is provided to an antenna, normally a parabolic dish type antenna, for transmission and reception to satellite 106.

FIG. 3 is an address diagram that is stored in database 212 which graphically illustrates identification address space 300 in accordance with the teachings of the present invention. Each NMC at NMF 104 has associated with it its own address space 300 for dynamically allocating identification addresses to MCTs. It should be understood that the total address space in FIG. 3, as well as the division thereof, is merely illustrative, and that the present invention is equally applicable to systems using a fewer or a greater number of total addresses, as well as different allocation schemes.

In the exemplary embodiment, the address frame comprises an address field and a channel field. The address field is 19 bits long, allowing 524,288 distinct addresses to identify MCTs in the system. As shown in FIG. 3, address range 302 represents an address range of between hex 00000 and hex 3FFFF, or 262,144 addresses ranging from 0 to 262,143. Address range 302 represents static addresses for MCTs already in use in the communication system. That is, these addresses are each permanently assigned to a particular MCT corresponding to each MCT's serial number. Once a static address has been assigned to an MCT, it is always used to identify that particular MCT, no matter which NMC it is using to communicate through. Therefore, prior to implementation of the present invention, the number of MCTs able to be uniquely identified in communication system 100 was limited to the number of addresses in address range 302, which, in the exemplary embodiment, was 262,144 addresses.

Address range 304 represents a reserved subset of address space of the total number of identification addresses available which are dynamically assigned to MCTs on an "as-needed" basis. Dynamic address assignment refers to the assignment of unused identification addresses, and subsequent withdrawal of previously assigned addresses, to MCTs in the communication system. Unlike the addressing scheme of the past, the present invention allows NMCs to dynamically assign identification addresses independent of other NMCs, while allowing existing MCTs to continue using the permanent address scheme of the prior art. Thus, a first NMC may assign any unused identification address in address range 304 to a first MCT, while the same identification address can be assigned by a second NMC to address a second MCT, as long as the first and second MCTs operate through their respective NMCs.

Address range 304 comprises an address range of between hex 40000 and hex 4FFFF in the exemplary embodiment, or 65,536 addresses ranging from 262,144 to 327,679. Importantly, the 65,536 dynamic addresses available to each NMC dramatically increases the number of MCTs that can be uniquely identified in the system, limited only by the number of NMCs/transponders available.

Finally, address range 306 represents an address range of between hex 50000 and hex 7FFFF, or 196,608 addresses ranging from 327,680 to 524,287. This address range can be used for other special addressing needs, such as defining groups of MCTs to which a single message can be sent. Again, it should be understood that the previous description of the MCT address structure is not limited to the size and address ranges as described herein. A greater or lesser number of bits can be used in the address field resulting in a greater or lesser numbers of identification addresses available to be assigned. Each address range 302, 304, and 306 can be chosen to contain greater or fewer numbers of addresses and each address range can be assigned to different ranges in the address space or even be divided into smaller, non-adjacent segments of address ranges. It should also be understood that the present invention is applicable to systems that do not allow for group addresses, static addresses, or both. In other words, a communication system may rely only on dynamic address allocation to uniquely identify MCTs per the teachings of the present invention.

Identification addresses are assigned and withdrawn as MCTs acquire new NMCs through which to communicate. For example, a new identification address is dynamically assigned to MCT 110 during initial communication with a pre-determined NMC or generally any time MCT 110 begins operation through a different NMC. Communication through a new NMC is initiated either by a request from MCT 110 or by an assignment from NMF 104. Requests which are initiated by MCT 110 are due to pre-determined events such as initialization or loss of clock (described later herein). Assignments from NMF 104 include such events as handoff, pokeover, a change in NMC initiated by NMF operators, or a change in the assigned frequency for MCT 110 to communicate. The loss of clock event and NMC initiated events are described in greater detail later herein.

Initialization occurs when MCT 110 is first placed in use in the communication system. While each MCT 110 placed into service is assigned a serial number and a particular NMC through which to communicate, no identification address is yet assigned by the NMC. Thus, such a unit may not yet send and receive standard voice and/or data messages until it has been assigned an identification address by its pre-determined NMC from address range 304. Therefore, a request is sent by MCT 110 to a pre-determined NMC, requesting an unused identification address from address range 304. The NMC responds by issuing an unused address from address range 304. Typically, this response occurs within a pre-determined amount of time from when the NMC receives the assignment request. In the exemplary embodiment, an acknowledgment message is sent from MCT 110 to the NMC if it has successfully received the address assignment. MCT 110 then uses the assigned address in all further communications with the pre-assigned NMC.

MCT 110 may also initiate an address request from the NMC after a loss of clock event. In the exemplary embodiment of the present invention, MCT 110 keeps track of the elapsed time from the last time it was assigned an identification address. A loss of clock event is defined as any time that MCT 110 loses track of this time. This might occur for a number of reasons, for example, a power failure onboard vehicle 108. MCT 110 determines a loss of clock event by using one of a number of techniques known in the art for detecting such power failures. Upon realization of a loss of clock event, a new address is requested in a manner similar to an initialization address request, described above. The previous identification address used by MCT 110 is withdrawn by the NMC and given an "unassigned" status so that it may be re-used at a later time by another MCT requiring address assignment.

Alternatively, address assignment may be initiated by the NMC upon the occurrence of a pre-defined event, such as handoff, pokeover, a change in NMC directed by NMF operators, or a change in the assigned communication frequency to MCT 110. Handoff refers to an event whereby the NMC assigns MCT 110 a new frequency over which to operate, generally when MCT 110 crosses a pre-determined physical boundary requiring a change in satellites. A boundary crossing can be determined if vehicle 108 provides position reports to the NMC, for example, at pre-determined intervals of time. When a position report from vehicle 108 indicates that a pre-determined boundary has been crossed, the NMC may assign a new frequency pair to MCT 110 over which to communicate. The frequency assignment contains an NMC identification signal which specifies which NMC is associated with the new set of frequencies. When the new frequencies are assigned, MCT 110 compares the new NMC identification signal with the previous NMC identification. If the comparison indicates that a new NMC has been assigned, MCT 110 requests a new identification address from the new NMC, as described in detail below.

Another event similar to handoff is a new frequency plan assignment. When an MCT is placed into service for the first time, it is pre-programmed at a manufacturing facility to operate on a particular NMC using an associated transmit and receive frequency. Generally, these initial frequency settings are changed by the NMC upon initialization. Like the frequency change during handoff, MCT 110 will compare the NMC identification signal associated with the new frequencies to the NMC identification of the previous NMC. If a new NMC is identified, MCT 110 requests a new identification address from the new NMC.

Other events initiated by the NMC which require a new identification address to be issued include pokeover and a change in NMC directed by NMF operators. Pokeover refers to the NMC assigning a new set of frequencies on which to communicate due to MCT 110 communicating with a different NMC other than the one it has been assigned to communicate through. An NMC change by NMF operators occurs when the number of MCTs operating on any one NMC becomes much greater or much less than the number of MCTs operating on other NMCs. In this case, MCTs may be assigned new NMCs, and, thus, new identification addresses, in order to evenly distribute MCTs over the available NMCs. Generally, the communication system of the present invention operates more efficiently when each NMC is assigned approximately an equal number of MCTs. In either of these events, MCT 110 compares the NMC identification associated with the new and previous frequencies, and requests a new identification address if the new frequencies require communication using a new NMC.

In the exemplary embodiment of the present invention, MCT 110 must periodically inform the NMC that it is still using the identification address to which it has previously been assigned. MCT 110 initiates this process, called "refresh", each time a pre-defined amount of time elapses from when an identification address is received by MCT 110. A typical value for the pre-determined amount of time is one week, although other time periods may be used instead. MCT 110 uses a timer onboard vehicle 108 to determine the elapsed time from when an address assignment was received. After the pre-determined amount of time has elapsed, MCT 110 attempts to refresh its address with the NMC. If, for some reason, MCT 110 fails to establish communications with the NMC, MCT 110 will continue trying to refresh until a second pre-determined amount of time elapses. In the exemplary embodiment, the second pre-determined amount of time is equal to one-and-a-half times the first pre-determined amount of time. This allows MCT 110 enough time to refresh its address if initial attempts prove to be unsuccessful. MCT 110 may, for example, have difficulty communicating with satellite 106 if the vehicle to which it is attached is parked underneath a highway overpass. After the second pre-determined time elapses, MCT 110 ceases to use its assigned identification address and begins requesting a new address from the NMC.

At the NMC, if a refresh is not received by a particular MCT within a third pre-determined amount of time, (in the exemplary embodiment, two times longer than the first pre-determined amount of time) the NMC will assume that the particular MCT has ceased using the originally assigned identification address and, thus, the originally assigned identification address is withdrawn as an active address so that it may be assigned to another MCT.

In the exemplary communication system used by the present invention, communications between NMC 104 and MCT 110 are accomplished using a well-known packet transmission protocol in which messages are transmitted using, generally, an address frame followed by one or more data frames. However, more than one address frame may be used in other communication systems. The address frame comprises an address field and a channel field. The address field normally identifies which MCT in the communication system is to receive a message, transmitted at a later time in one or more data frames. The channel field contains timing information for receiving the transmitted data frame. Generally, each MCT in the communication system monitors a pre-defined frequency, or address channel, corresponding to the particular NMC to which they are assigned, for an address frame matching its pre-assigned serial number, indicating a forthcoming message. Upon determining a match, the intended MCT tunes to a time and frequency channel as indicated by a channel number contained in the address frame to receive one or more data frames. The MCT then processes the message contained in the data frame(s).

FIG. 4 shows address frame 400, comprising channel field 402 and address field 404, as used in the communication system described in the '170, '274, and '926 patents. Referring to FIG. 4, The "c"s represent channel field bits and the "a"s represent address field bits. It should be understood that other communication systems might use an address frame with a fewer or a greater number of bits in the address and/or channel field. It should be further understood that information contained in the channel and address fields need not be transmitted within the same address frame, nor that they be ordered as shown in FIG. 4.

As shown in FIG. 4, channel field 402 contains 5 bits, numbered 19 through 23, specifying a total of $2^5$ or 32 possible channels. In the exemplary embodiment, channels 2 through 24 are used to indicate that a message is forthcoming to an MCT who has already been assigned an identification address, either using the permanent address scheme of the prior art or the dynamic addressing scheme of the present invention. The channel number indicates a time/frequency channel in which to receive the data frame. Address field 404 comprises 19 data bits, numbered 0 through 18, and contains the identification address of a particular MCT for which a message is intended. During normal communications with MCT 110 having an already-assigned identification address, address field 404 is evaluated to determine if a match is present between its assigned identification address and the address contained in the address field. MCT 110 also determines whether or not the 14 least significant bits of its pre-assigned serial number matches the 14 least significant bits in address field 404 and if bits 16 through 18 are equal to a preselected bit patter, in the exemplary embodiment '0', '0', and '1', respectively. If either of these conditions is true, MCT 110 must then evaluate channel field 402 to determine if an address assignment is being transmitted. If neither of these conditions are true, no further processing is performed on address frame 400, and MCT 110 returns to monitoring the address channel for subsequent address frames.

If channel field 402 indicates a channel of between 2 and 24, it is an indication that an normal message is being transmitted to MCT 110, such as a voice or data message. MCT 110 then tunes to the time/frequency channel indicated by channel field 402 to receive one or more data frames containing the message. If channel field 402 indicates a channel number of between 25 and 31, however, it is an indication that an address assignment is being transmitted, and the address frame is then referred to as an address assignment frame 500, as shown in FIG. 5.

Like address frame 400, address assignment frame 500 comprises channel field 502 and address field 504, and contains the same number of bits per field as address frame 400. The 14 least significant bits in address field 504, bits 0 through 13, represent a partial MCT identification code, comprising the 14 least significant bits of a permanent MCT identification code which has been permanently assigned to each MCT. The MCT identification code is typically its pre-assigned serial number. Address field 504 further comprises channel bits 14 and 15 representing a partial channel identification code, to be explained below, and bits 16 through 18 being pre-assigned a predetermined bit patter, in the exemplary embodiment, 0, 0, and 1, respectively. Bits 16 through 18, being assigned the values mentioned, ensure that address field 504 specifies an address of between hex 40000 to hex 4FFFF, corresponding to address range 304 of FIG. 3, the addresses reserved for dynamic address allocation.

If an address assignment frame has been detected, MCT 110 must compare the 14 least significant bits of address field 504 to the 14 least significant bits of its pre-assigned serial number and also determine if bits 16 through 18 are equal to '0', '0', '1', respectively. If these conditions are true, it indicates that MCT 110 is potentially the one MCT for which the new identification address is intended. In other words, more than one MCT operating through the same NMC can have the same 14 least significant bits in its serial number (i.e., every $2^{14}$ or 16,384 MCTs manufactured will have the same 14 least significant bits in its pre-assigned serial number).

Each MCT whose 14 least significant bits of its serial number matches the 14 least significant bits of address field 504 must tune to a time/frequency channel to receive the data frame, as indicated by a combination of the 5 channel bits in channel field 502 and the 2 additional channel bits, bits 14 and 15, in address field 504, explained below.

The channel number in which to receive a data frame is determined by taking the decimal equivalent of the 5 bits comprising channel field 502 and subtracting a pre-determined number equal to, in the exemplary embodiment, the maximum number of channels available. In the exemplary embodiment, channels 0 through 24 are available for use, for a total of 25 channels. The resulting value from this operation is a decimal number from between decimal 0 and 6. The binary equivalent of the resulting value is then used as the most significant bits of the channel number. These bits are then combined with bits 14 and 15 from address field 504, bits 14 and 15 representing the least significant bits in the combination, respectively. The combination results in a binary number which is 5 bits long, representing the channel number to which an MCT having matched the partial MCT identification code of bits 0 through 13 must tune to in order to receive a data frame available on the identified channel. The data frame contains a complete MCT serial number and an assigned identification address to the particular MCT of interest. The identification address is assigned to the MCT whose MCT serial number matches the complete MCT identification code in the data frame. From then on, all messages between the NMC and the particular MCT will be addressed using this identification address.

A brief example will more clearly illustrate the above process. Assume that channel bits 23 through 19 comprise a "11100" bit pattern in address assignment frame 500 and further that bits 15 and 14, the additional channel bits, comprise a "10" bit pattern, respectively The address frame is identified as an address assignment frame 500 because the 5 channel bits represent a channel number of between 25 and 31, in this example, decimal "28". The number of channels available for use in this system is 25 (channels 0 through 24), therefore, 25 is subtracted from 28 to yield decimal 3. Decimal 3 is equal to binary "11". These 2 bits are used as the most significant bits which are combined with address field bits 15 and 14, being "1" and "0", respectively. The final result is binary "1110", or decimal 14, indicating that a data frame is available to be received at channel number 14. The data frame contains the new identification address chosen from address range 304 of FIG. 3, and an entire MCT serial number which identifies the particular MCT which is to receive the new identification address. The identified MCT then begins using the new identification address in all further communications with the NMC.

An important feature of the present invention is the ability to assign an identification address to an MCT which does not currently have an identification address assigned. MCTs which do not currently have an identification address assigned monitor one or more address channels for address frames in a similar way as MCTs who do have a current identification address assigned. When an address frame is received, MCT 110 compares the 14 least significant bits of its pre-assigned serial number to the 14 least significant bits of the address field and determines if bits 16 through 18 are equal to '0', '0', '1', respectively, to determine a match. If a match is found, MCT 110 must then evaluate the channel field to determine if the address frame is a normal address frame 400 or an address assignment frame 500. More than one MCT may match the 14 least significant bits of the address field. As explained above, if the channel field indicates a channel of between 2 and 24, a normal address frame is present, and MCT 110 performs no further analysis on address frame 400. In this case, MCT 110 reverts back to monitoring the address channel for subsequent address frames.

If the channel field indicates a channel of between 25 and 31, indicating an address assignment frame 500, any MCT which has matched the 14 least significant bits of the address field and having bits 16 through 18 equal to '0', '0', '1', respectively, must tune to the time/frequency channel indicated by the 5 bits of channel field 502 and the 2 additional channel bits in address field 504, as explained above. Each MCT then receives a data frame at the indicated time/frequency channel and compares its complete serial number to a complete serial number contained within the data frame. The one MCT which matches its complete serial number to the serial number contained within the data frame is assigned the new identification address, which is also contained within the data frame.

In short, an identification address is dynamically assigned to a particular MCT as follows. Every MCT in the communication system monitors one or more pre-determined address channels corresponding to an NMC to which it has been assigned. When an address frame is received by an MCT, the 19 bits of the address field is checked to determine if it matches with an already-assigned identification address (if any) or if the last 14 bits of the address field matches the 14 least significant bits of an MCT's serial number, and if bits 16 through 18 are equal to '0', '0', '1', respectively. If either condition is present, one or more MCTs then determine whether the current frame is a normal address frame 400, or an address assignment frame 500 by evaluating the 5 channel bits in the address frame. If a normal address frame 400 is present, the one MCT having its already-assigned identification address matching the 19 address field bits tunes to a time/frequency channel indicated by the 5 channel bits to receive a voice or data message. If an address assignment frame 500 is instead determined, then any MCTs having the 14 least significant bits of an assigned serial number matching the 14 least significant bits of the address field, and having bits 16 through 18 equal to '0', '0', '1', respectively, tunes to a time/frequency channel indicated by a combination of the 5 bits in the channel field and the 2 additional channel bits contained in the address field, as explained above. Each of these MCTs receives a data frame available in the specified channel number containing a complete MCT serial number and identification address. Again, the one MCT who matches the complete serial number contained within the data frame is assigned the identification address also contained within the data frame.

Figure 6A:
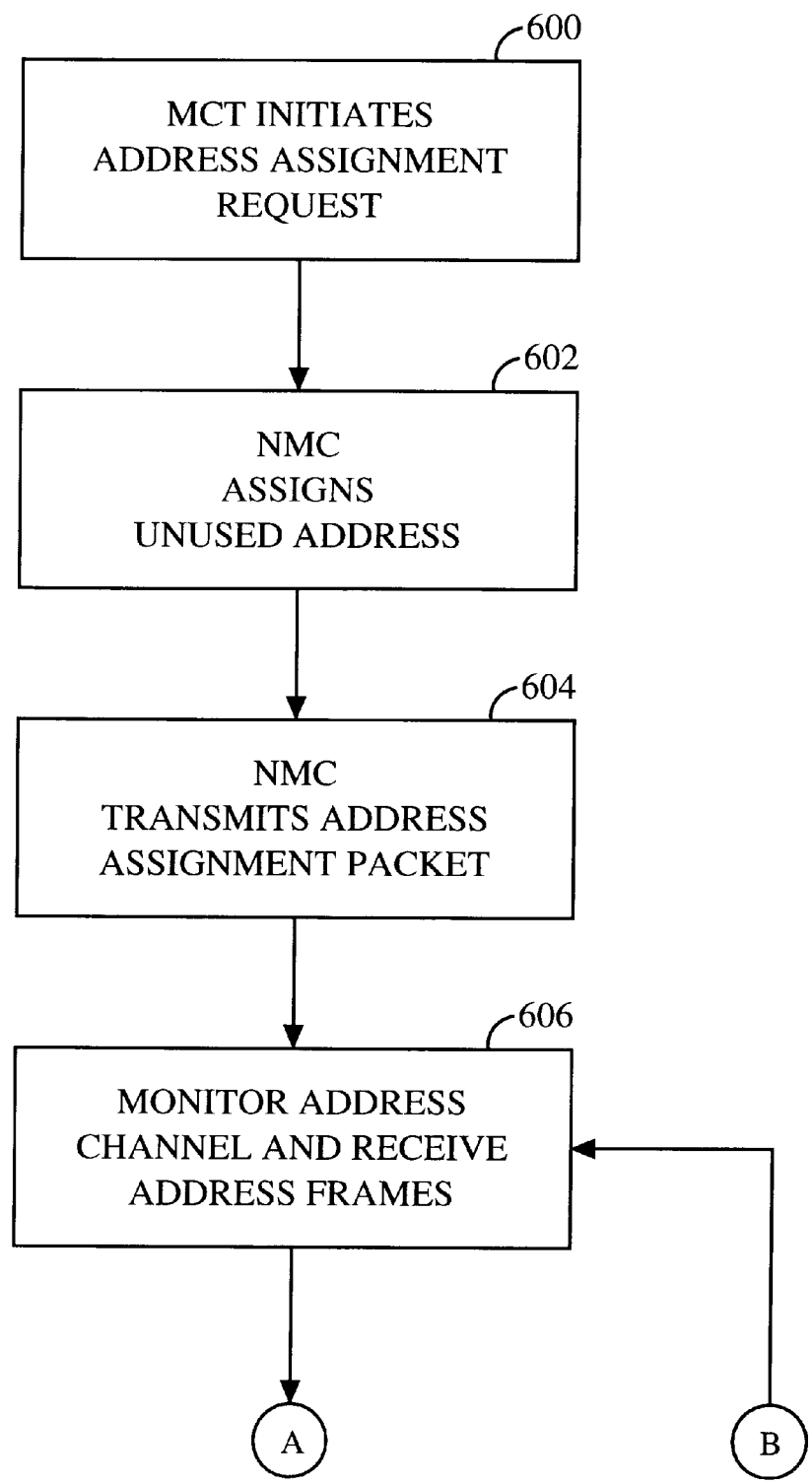
FIGS. 6a, 6b, and 6c represent a flow diagram illustrating the steps performed in using dynamic address allocation.
Figure 6B:
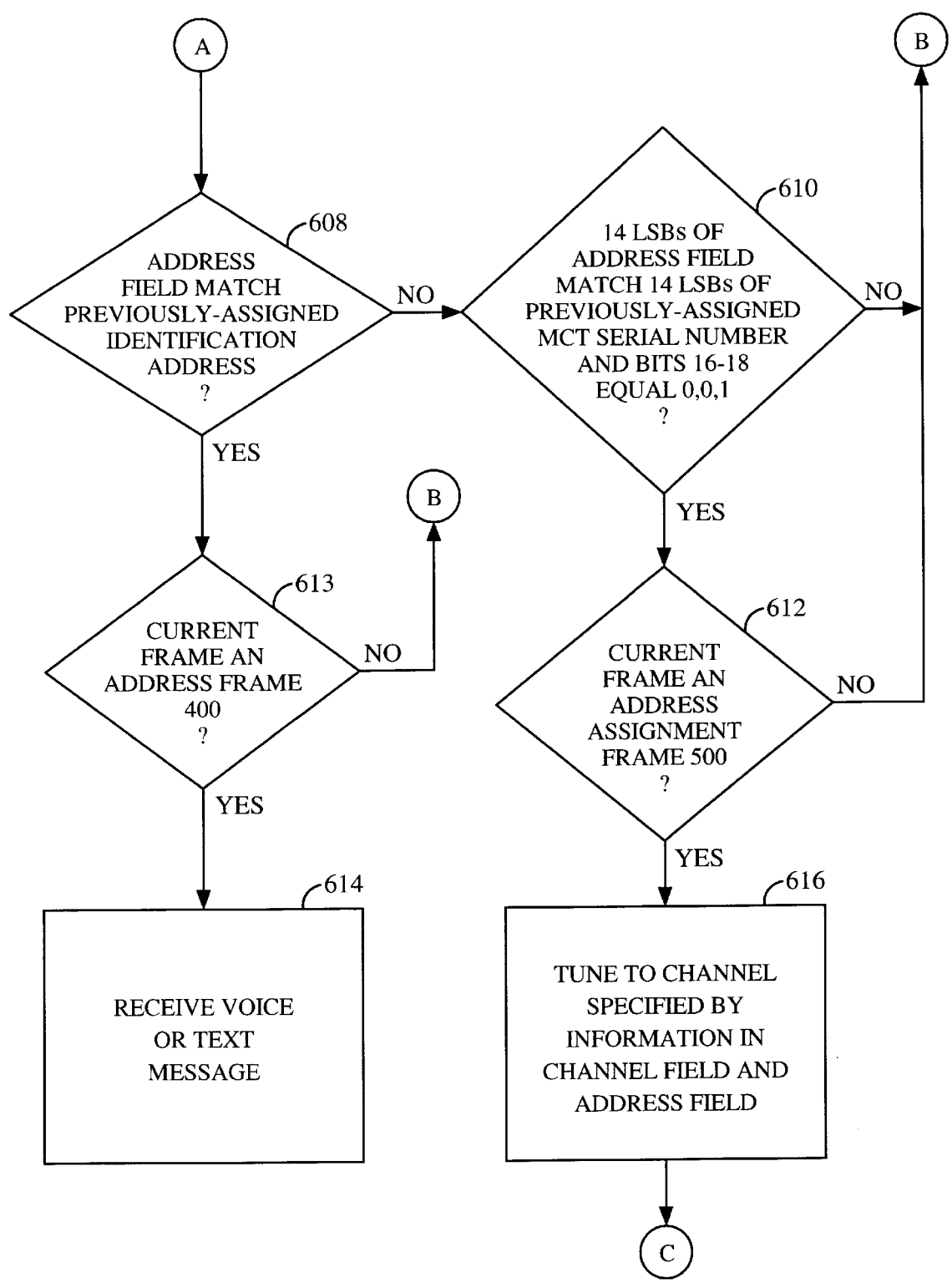
Figure 6C:
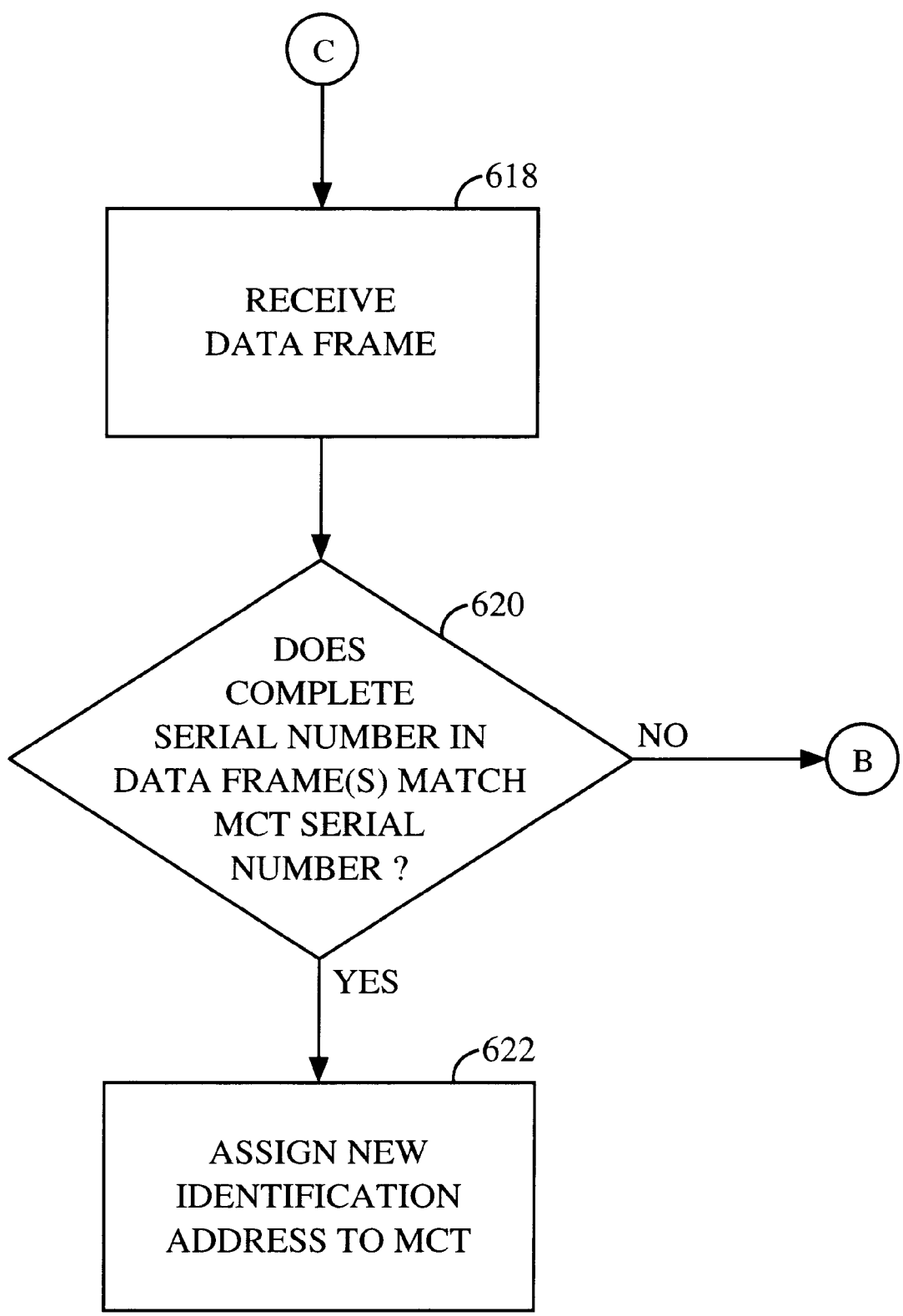

FIGS. 6a, 6b, and 6c represent a flow diagram illustrating the steps performed in dynamically assigning a new identification address to an MCT either having an already-assigned identification address or not. Even though a single MCT is referenced in the following flow diagram, it should be understood that many MCTs are present in the communication system, each MCT performing the steps shown in FIGS. 6a, 6b, and 6c. Additionally, the steps reflect the general process by which the present invention operates, along with a detailed description of the exemplary embodiment.

Dynamic allocation begins with step 600, as shown in FIG. 6a, in which an address request is sent by MCT 110. If an identification address is presently assigned to MCT 110, the current identification address is sent to the NMC in order to identify which MCT is requesting the new address. If MCT 110 does not have a current identification address assigned, then a "0" is transmitted in place of the identification address, indicating that no identification address has yet been assigned.

In step 602, the NMC receives the identification address request and chooses an unused identification address from a set of addresses reserved for dynamic address allocation. In the exemplary embodiment, approximately 65,000 addresses are available in each address space 304 to each NMC in NMF 104 for dynamic allocation. The NMC may use one of any number of techniques to choose the address to be assigned, for example, the NMC may begin with the smallest address and choose the first unassigned one, or it may select unused addresses based on a hashing algorithm, in order to distribute addresses evenly throughout the entire range of addresses.

In step 604, the NMC transmits a message by way of satellite 106 which is intended for MCT 110. The message comprises an address frame and at least one data frame. The address frame is transmitted on a pre-assigned address channel and the data frame is transmitted in a time/frequency channel in accordance with a channel number assigned by the NMC.

Each MCT in communication with the NMC monitors one or more pre-assigned address channels to receive address frames, shown in FIG. 6a as step 606. In step 608, shown in FIG. 6b, MCT 110 evaluates an address field contained within the received address frame to determine if the 19 bits contained in the address field matches its already-assigned identification address, if such an identification address has been previously assigned. Only one MCT will match this 19 bit identification address. If no match is found, MCT 110 next determines if the 14 least significant bits of the address field matches the 14 least significant bits of the pre-assigned serial number assigned to it, and if bits 16 through 18 are equal to '0','0','1',respectively, in step 610. If no match is found, the data frame corresponding to the current address frame is not intended for MCT 110, and processing returns to monitoring the address channel for subsequent address frames in step 606. If a match is found in either step 608 or step 610, then the data frame is potentially intended for MCT 110.

If an MCT 110 determines a match between the identification address previously assigned to it and the 19 bit address field in step 608, step 613 is performed in which it is determined whether or not the received address frame is an address frame 400. The determination is accomplished by evaluating the 5 bit channel field in the address frame. If the channel number indicates a channel of between 2 and 24, an address frame 400 is present. If the channel number indicates a channel of between 25 and 31, an address assignment frame 500 is present. If an address frame 400 is present, the single MCT which has matched the 19 bits in step 608 then tunes to the time/frequency channel indicated by the 5 channel bits of channel field 402 to receive the data frame. This is shown in step 614. If an address assignment frame 500 is detected, MCT 110 ignores the received address assignment frame 500 and resumes monitoring one or more address channels for further address frames in step 606.

If an MCT 110 does not determine a match between its previously assigned identification address and the 19 bit address field in step 608, but determines that the 14 least significant bits of the address field matches the 14 least significant bits of MCT 110 pre-assigned serial number and bits 16 through 18 are equal to '0','0','1',respectively, in step 610, then step 612 is performed in which it is determined whether or not the received address frame is an address assignment frame 500. This is determined, as in step 613, by evaluating the 5 bit channel field in the address frame. If the channel number indicates a channel of between 25 and 31, an address assignment frame 500 is present and additional processing is performed in step 616. If an address frame 400 is detected, MCT 110 ignores the received address frame 400 and resumes monitoring one or more address channels for further address frames in step 606.

In step 616, MCT(s) which matched the 14 least significant bits and having bits 16 through 18 equal to '0', '0', '1' evaluate(s) the 5 channel bits in channel field 502 and the 2 additional channel bits in address field 504 to determine which time/frequency channel to tune to in order to receive the data frame. Each MCT at this step then tunes to the calculated time/frequency channel. In step 618, shown in FIG. 6c, the data frame(s) corresponding to the received address assignment frame 500 is received by each of the MCT's. In step 620, each MCT determines if its complete serial number matches the serial number contained within the data frame. In step 622, the single MCT which successfully matches the complete serial number in the data frame is assigned the new identification address which is also contained within the data frame. The new identification address is then used in all further communication between MCT 110 and the NMC.

The previous description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for dynamically assigning identification addresses to a mobile communication terminal (ICT) in a satellite communication system, comprising the steps of:

reserving a subset of identification addresses from a fixed number of addresses;

transmitting an address assignment frame and at least one data frame from a network management computer (NMC), said at least one data frame comprising a complete MCT identification code and an unused one of said subset of identification addresses;

receiving said address assignment frame by at least one MCT;

determining whether or not to receive said at least one data frame;

tuning to a time/frequency channel specified by said address assignment frame to receive said at least one data frame; and assigning said assigned identification address to a single MCT whose permanent MCT identification code matches said complete MCT identification code.

2. The method of claim 1 wherein said first pre-defined event is selected from the group comprising initialization, loss of clock, handoff, a refresh time-out, pokeover, a change in a network management computer (NMC), and a change in an assigned frequency to said MCT.

3. The method of claim 1 wherein said complete MCT identification code comprises a pre-assigned MCT serial number.

4. The method of claim 1 wherein said address assignment frame comprises a channel field and an address field, said address field comprising at least a partial MCT identification code.

5. The method of claim 4 wherein the step of determining whether or not to receive said at least one data frame comprises the steps of:

determining if said partial MCT identification code contained in said address field matches a portion of a pre-assigned MCT identification code;

determining if said channel field indicates said address assignment frame; and receiving said data frame when said partial MCT identification code contained in said address field matches at a portion of said pre-assigned MCT identification code and said channel field indicates said address assignment frame.

6. The method of claim 5 further comprising the step of determining, prior to the channel field determination step, when a previously-assigned MCT identification address matches said address field.

7. The method of claim 3 wherein the step of tuning to a time/frequency channel comprises the step of combining said channel field with information contained in said address field.

8. The method of claim 7 wherein the step of combining said channel field with information contained in said address field comprises the steps of:

subtracting a pre-determined number from said channel field;

using the result of the subtracting step as the most significant bits of said channel number; and using at least one bit from said address field as the least significant bits of said channel number, wherein said channel number comprises the combination of said most significant bits and said least significant bits.

9. The method of claim 8 wherein said pre-determined number is equal to the maximum number of channels available.

10. A system for dynamically assigning identification information to a mobile communication terminal (MCT) in a satellite communication system, comprising:

at least one storage device located at a network management center (NMC) for storing mobile communication terminal (MCT) identification addresses;

at least one computing device connected to said at least one storage device for selecting an unassigned one of said identification addresses from said at least one storage device upon the occurrence of a pre-defined event, and for generating an address assignment frame and at least one data frame, said at least one data frame comprising a complete MCT identification code and said unassigned identification address;

a transmitter, connected to said at least one computing device, for transmitting said address assignment frame and at least one data frame to a specified MCT;

a receiver located at said specified MCT for receiving said address assignment frame; and a processor connected to said receiver for determining whether or not to receive said at least one data frame, said processor further for tuning said receiver to a time/frequency channel specified by said address assignment frame to receive said at least one data frame, said processor further for using said unassigned identification address if a permanent MCT identification code pre-assigned to said specified MCT matches said complete MCT identification code.

11. The apparatus of claim 10, wherein said occurrence of a pre-defined event is selected from the group comprising initialization, loss of clock, handoff, a refresh time-out, pokeover, a change in a network management computer, and a change in an assigned frequency to said MCT.

12. The apparatus of claim 10 wherein said computing device comprises a network management computer.

13. The apparatus of claim 10 wherein said storage device comprises a database.

* * * * *